UNITED STATES PATENT OFFICE.

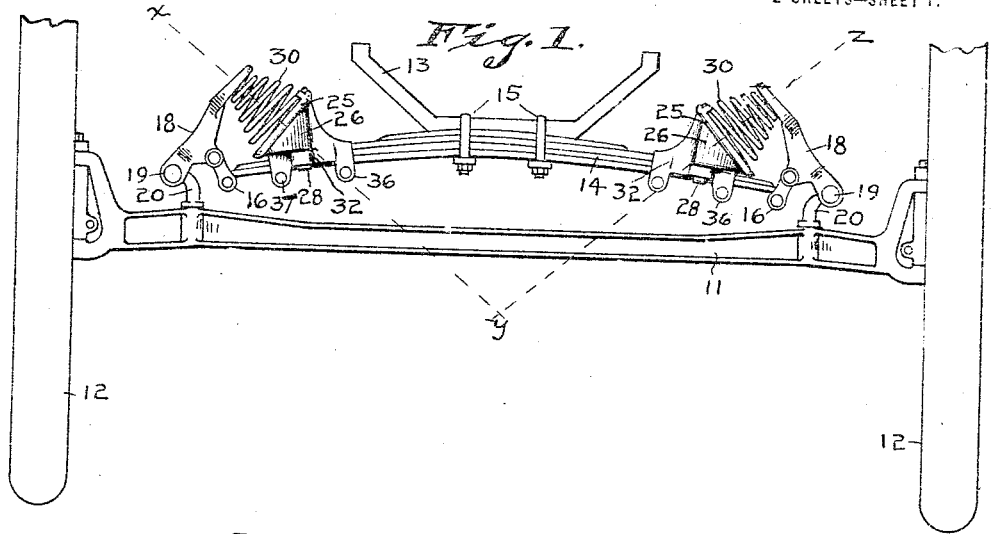
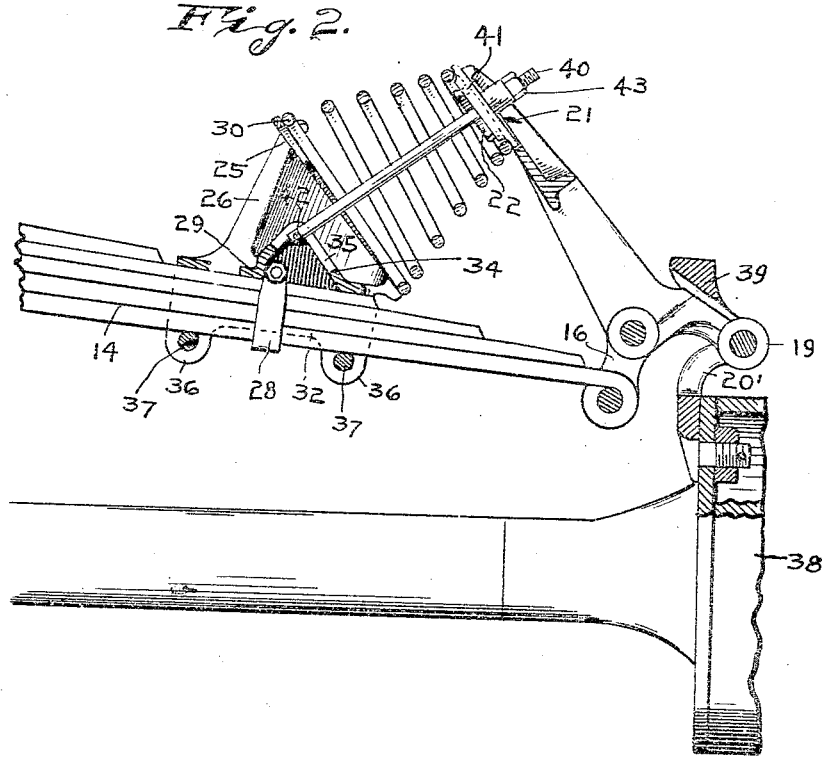

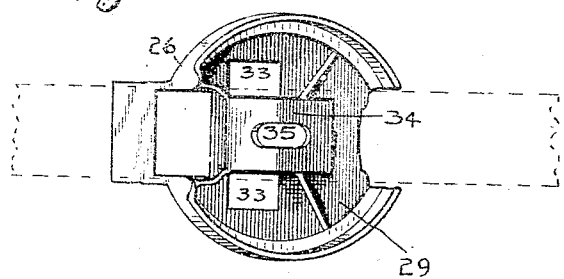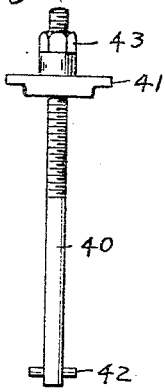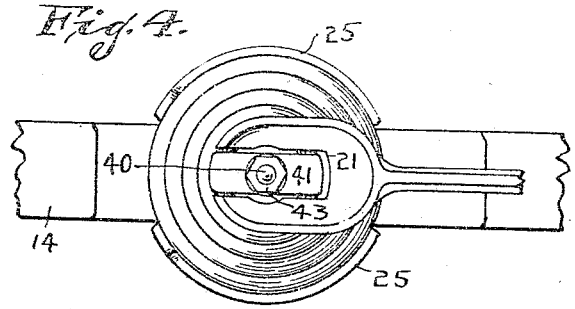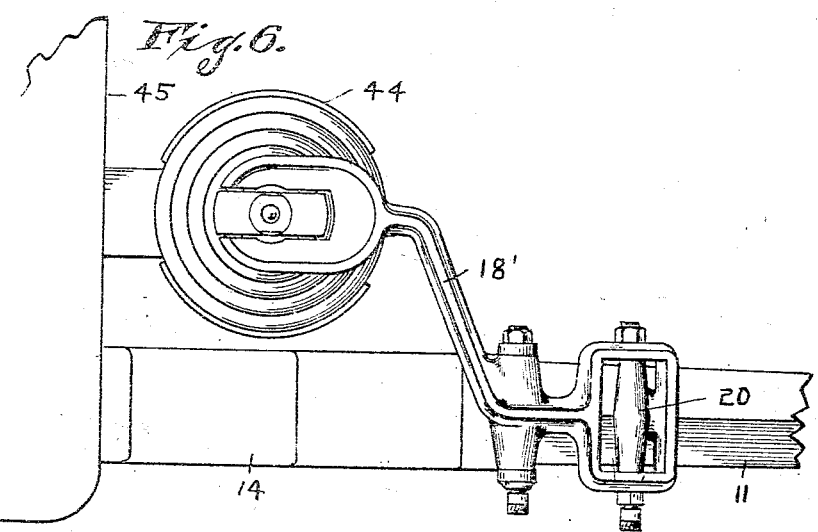

ROBERT H. HASSLER, OF INDIANAPOLIS, INDIANA.

VEHICLE.

1,149,756.

Specification of Letters Patent.

Patented Aug. 10, 1915.

Application filed March 2, 1915. Serial No. 11,591.

*To all whom it may concern:*

Be it known that I, ROBERT H. HASSLER, a citizen of the United States, residing at Indianapolis, in the county of Marion and State of Indiana, have invented certain new and useful Improvements in Vehicles, of which the following is a specification.

This invention relates to improvements in shock absorbers for vehicles and particularly for motor-vehicles and the object is to provide a simple, durable and inexpensive device which will not only insure an extremely soft and sensitive spring-support for the vehicle body, but will prevent the whipping about and the side sway of said body on an undulating road and will cause the vehicle to hold the road at high speed and to steer easy at all times.

A further object is to provide for the easy assembly of the invention as an attachment to automobiles and other vehicles now in common use.

I accomplish the above, and other objects which will hereinafter appear, by the mechanism illustrated in the accompanying drawings, in which—

Figure 1, is a view in front elevation of the front axle of an automobile and front leaf spring equipped with my invention.
Fig. 2, is an elevation and partial vertical section of one end of the rear axle and rear leaf spring illustrating my invention and its manner of handling in the operation of assembly, the view being on a larger scale than used in Fig. 1. Fig. 3, is a top plan view of the seat for the base or large end of the auxiliary spring. Fig. 4, is a top plan view of same with the spring in operative position therein and compressed by a bolt in the operation of assembly, the end of the lever which contacts the small end of the auxiliary spring also being shown. Fig. 5, is an elevation of the bolt removed from the auxiliary spring, and Fig. 6, is a top plan view of a modified form in which the seat for the base of the auxiliary spring is supported from the vehicle body.

Like characters of reference indicate like parts throughout the several views of the drawings.

Referring to Fig. 1, of the drawings, 11 is the front axle of an automobile, 12 the front wheels, 13 a portion of the frame to which the body is attached and 14 a leaf or laminated spring, here shown as located transversely of the axis of the vehicle, and secured by clips 15 to the frame 13.

Each end of the spring 14 is formed with an eye by which it is pivotally attached to a shackle 16. A lever 18, one for each shackle 16, is pivoted at its lower end 19, to a perch 20, supported by the axle 11. The opposite and upper end of each lever 18, is expanded and flattened to form a bearing for the small end of a truncated conical volute or helical spring 30, which I will hereinafter refer to as the supplemental spring 30, and said expanded end of the lever is provided with a longitudinal central slot 21, to receive a spring-compression plate in the assembly of the invention, as will be hereinafter more particularly described. Depending from the expanded end of lever 18, on each side of the slot 21, are flanges 22, which enter between the coils at the small end of the supplemental spring 30, to center and hold the spring on its seat against lever 18.

The upper ends of the shackles 16, are pivotally attached to their respective levers 18, between the ends of said respective levers, and preferably closer to the lower ends 19, in the manner substantially as shown in Fig. 1.

The leaves of the spring 14, are bound together by clips 28, in the usual manner, and at these places I prefer to fasten seats 25, for the large ends of the auxiliary truncated conical volute springs 30, said seats 25, being in semi-annular pairs which are integral with supporting flanges 26, formed upon a plate 29, contacting the top of spring 14. The semi-annular seats 25, have flanges projecting upwardly of their outer edges to receive the coils at the large end of the supplemental spring 30, to center and hold that end of the supplemental spring on its seat. The plate 29, has integral depending plates 32—two in number, which are separated and parallel, to receive the spring 14, between them, preferably with a close fit, the plates being bent around the clip 28, and the plate 29, cut away at 33 (see Fig. 3) to avoid interference with the bolt of clip 28. The middle of the plate 29 is formed in a hollow wedge 34, having an elongated bolt-hole 35, to receive the end of an assembly-bolt and pin-projections.

The side-plates 32, have ears 36 extending below the leaf spring 14 and provided with holes through which bolts 37 for fastening the device to the leaf spring, are passed.

Fig. 2, shows the auxiliary spring and its connections as above described, on a larger scale and therefore plainer than same appear in Fig. 1, this view differing from Fig. 1, so far as the mechanism illustrated is concerned, in that the application is for the rear spring and axle wherein the perch 20' is attached to the axle flange 38, and has a member 39 to limit the rebound movement of the lever. This view also shows the use of the assembly-bolt 40, by which the auxiliary spring 30, is compressed between the semi-annular seats 25, and a compression plate 41, on the outer end of bolt 40. As shown in this figure, the pin-projections formed by passing a pin 42, through the lower end of bolt 40, are caught under the apex walls of the hollow wedge 34, while in use. The bolt-hole 35, is elongated to allow the pin 42, to be inserted through it in one position of the bolt, and then by a quarter-turn of the bolt the ends of the pin will engage the walls of the hollow wedge on each side of the slot. The compression plate 41, has a reduced inner side to center it in the end of the auxiliary spring, and the width of the plate is such as to pass freely through the slot 21, in the end of lever 18, during the assembly of the several parts on the vehicle. The end of the bolt 40, opposite pin 42, is screw-threaded to receive a nut 43, by means of which the required compression of the auxiliary spring is secured during the assembly and afterward released.

In the modification shown in Fig. 6, the support 44, for the large end of the auxiliary spring, instead of being upon the leaf-spring, is from the vehicle body 45, the lever 18' being bent as shown to allow the support 44, to be located at one side of the leaf spring to avoid interference.

In the operation of my device, the side sway of the body which the shackle suspensions 16, provide for, is almost entirely eliminated by the action of the auxiliary springs 30, 30, for each axle. The truncated conical volute formation of said auxiliary springs resists any tendency to bend their axes, and by placing these axes of each pair in outwardly oblique directions, as indicated by the dotted lines $x-y$, $y-z$, Fig. 1, the lateral swing of the suspended portion of the vehicle on the shackles 16, is prevented, in large measure, in both directions.

While I have described my invention with more or less minuteness of detail, I do not desire to be confined to the specific mechanism shown, unduly, or any more than is pointed out in the claims.

I claim —

1. In a vehicle, a support, a main spring, a lever pivoted to the support, means connecting the lever with the end of the main spring, and a conical volute auxiliary spring connected at one end with that portion of the vehicle subject to rebound and at the other end to the lever.

2. In a vehicle, a support, elastic means, a pair of levers, one on each side of the vehicle, pivoted to said support, means connecting each lever to said elastic means, and a pair of conical volute springs, one for each lever, connected at one end with that portion of the vehicle subject to rebound and at the other end with a corresponding one of said levers, the axes of said pair of auxiliary springs being oblique to each other and extending laterally of the axis of the vehicle.

3. In a vehicle, relatively fixed supports, a vehicle portion subject to rebound, and elastic means supporting the latter from the former comprising a plurality of conical volute springs distributed on opposite sides of the vehicle axis with the axes of the springs positioned laterally of the axis of the vehicle and with the axes of the springs on one side oblique to the axes of the springs on the other side.

4. In a vehicle, an axle, a leaf spring disposed longitudinally of the axle, shackles at the spring ends, lever supports on the axle near each end of the leaf spring, a lever pivoted to each support and to the adjacent shackles on the leaf spring, and a conical volute auxiliary spring for each lever connected at one end with a portion of the vehicle subject to rebound and at the other end to the lever.

5. In a vehicle, a support, a portion subject to rebound, a pair of levers pivotally supported from said support and arranged on opposite sides of the vehicle axis, a leaf spring connected at its ends with the levers, and a pair of conical volute springs, one between the end of each lever and the portion of the vehicle subject to rebound, the axes of said pair of springs being oblique to each other.

6. A seat for coiled compression springs having curved supporting walls terminating in a bottom having a hollow raised center, said center having an elongated apex opening for the insertion of a bolt with lateral projections.

7. The combination, with a coiled compression spring, of a seat at one end having a depressed center with a bottom having a hollow raised slotted portion, a bolt with lateral end projections passed through the slot and engaging said raised portion, the other end of the bolt being threaded, a nut on the threaded end of the bolt, and a compression plate between the nut and the adjacent end of the spring.

8. In a vehicle, a support, a main spring, a lever pivoted to the support and having its other end expanded to form a spring-seat, said seat being slotted, means connecting the lever with the end of the main spring, a coiled compression spring having one end in contact with said seat on the lever, a spring-seat at the other end of the compression spring having a depressed center having a bottom with a hollow raised and slotted portion, a bolt passing through the compression spring having screw threads at one end and lateral projections at the other, said last end being passed through the slot and engaging the interior raised portion of said last spring-seat, a nut on the threaded end of the bolt, and a compression plate between the nut and spring and entering the slot in the lever.

In witness whereof, I have hereunto set my hand and seal at Indianapolis, Indiana, this 20th day of February, A. D. one thousand nine hundred and fifteen.

ROBERT H. HASSLER. [L. S.]

Witnesses:
 F. W. WOERNER,
 J. A. MINTURN.